Figure 1:
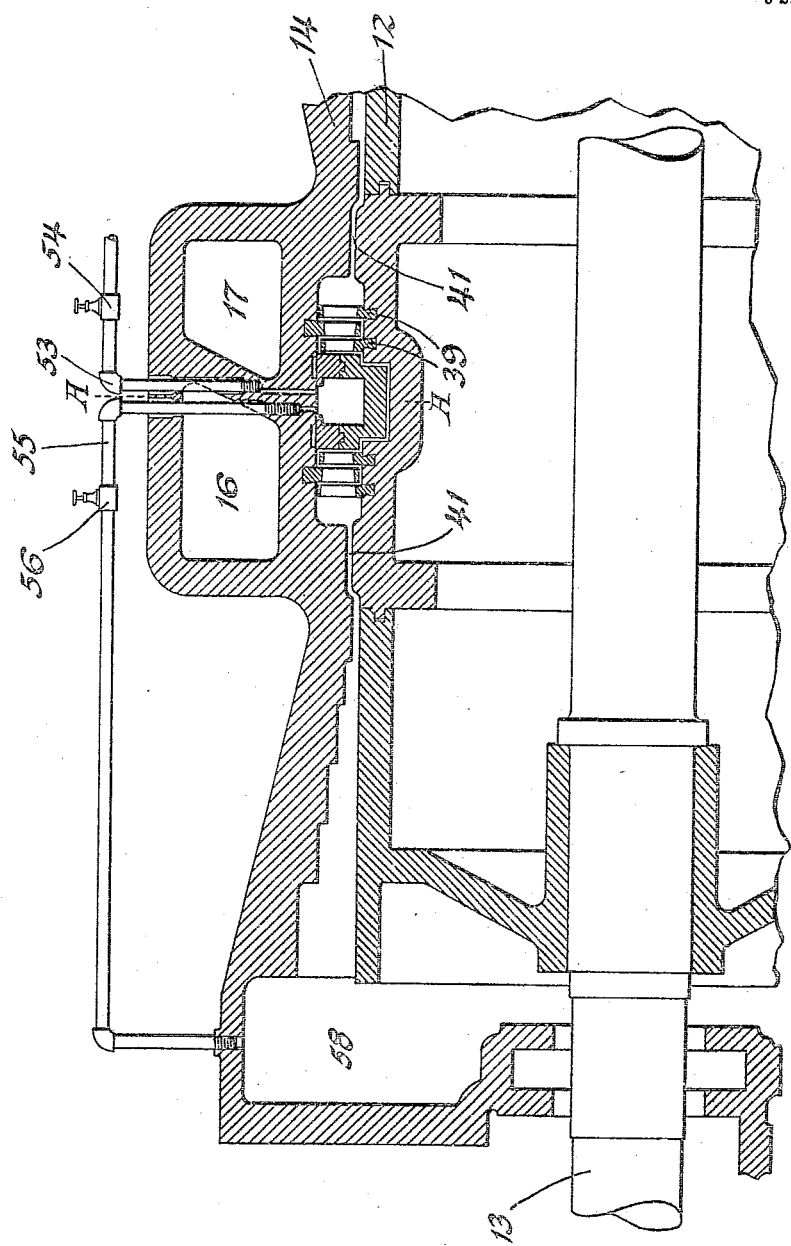

G. WESTINGHOUSE.
ELASTIC FLUID TURBINE.
APPLICATION FILED DEC. 29, 1905.

953,567.

Patented Mar. 29, 1910.
5 SHEETS—SHEET 1.

WITNESSES:

INVENTOR

ATTORNEY

G. WESTINGHOUSE.
ELASTIC FLUID TURBINE.
APPLICATION FILED DEC. 29, 1905.

953,567.

Patented Mar. 29, 1910.
5 SHEETS—SHEET 2.

WITNESSES:

INVENTOR
George Westinghouse
BY
ATTORNEY

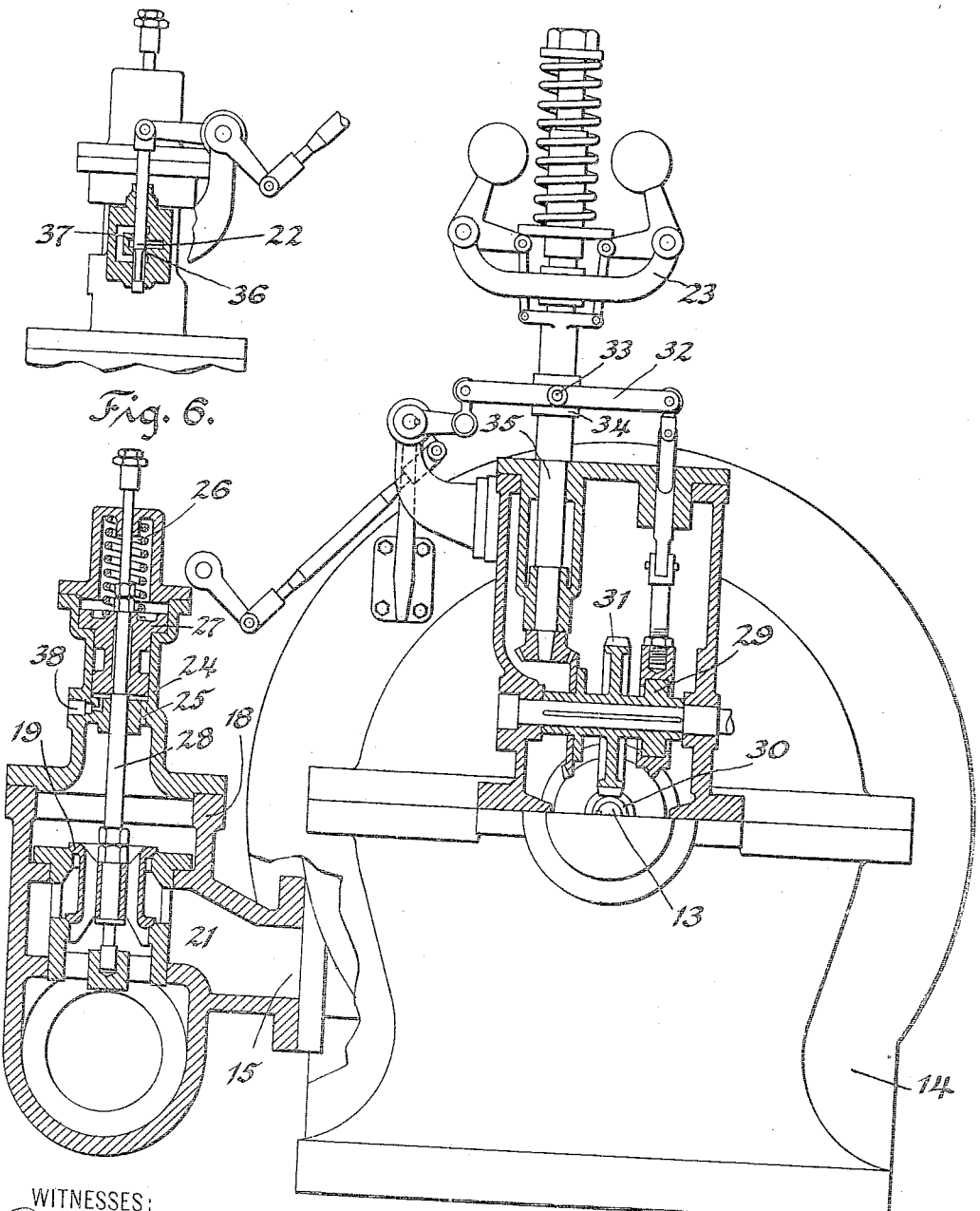

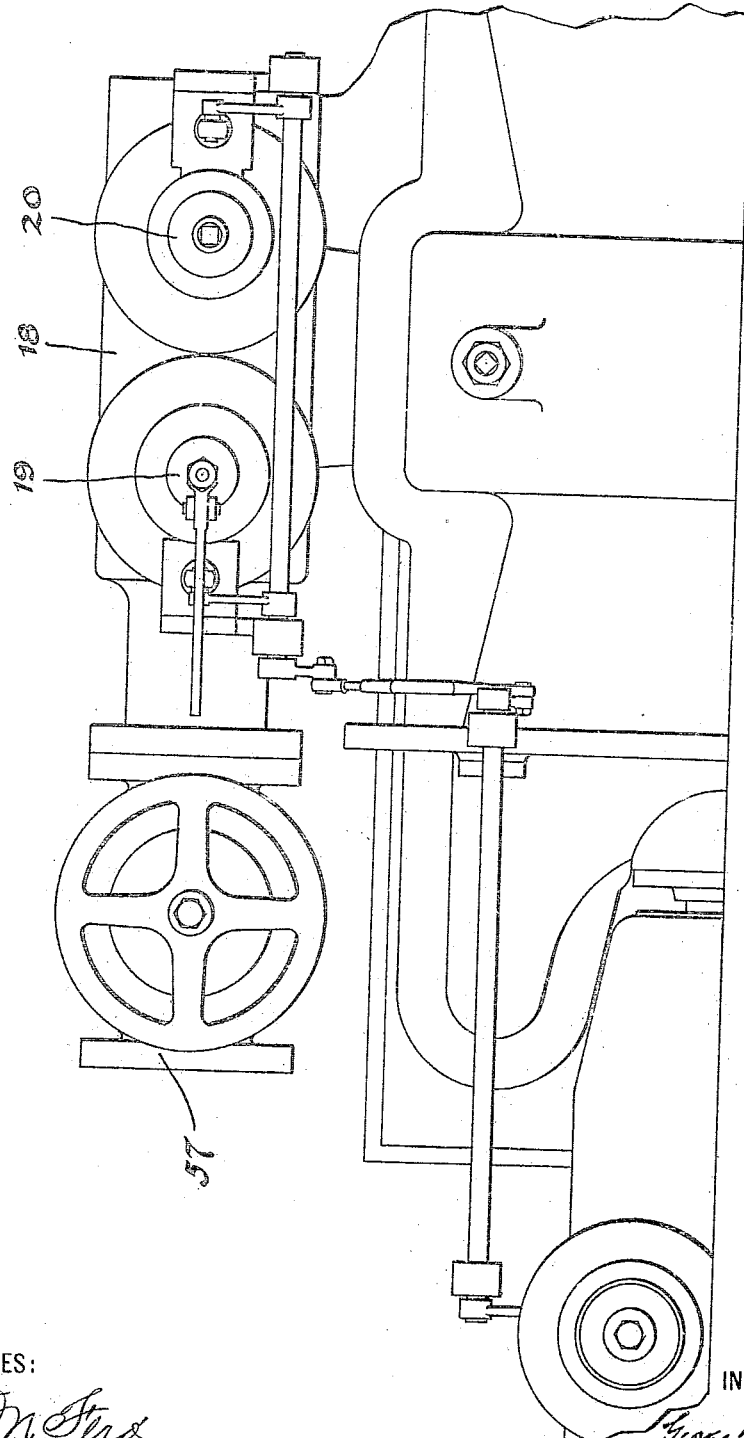

G. WESTINGHOUSE.
ELASTIC FLUID TURBINE.
APPLICATION FILED DEC. 29, 1905.
953,567.
Patented Mar. 29, 1910.
5 SHEETS—SHEET 5.
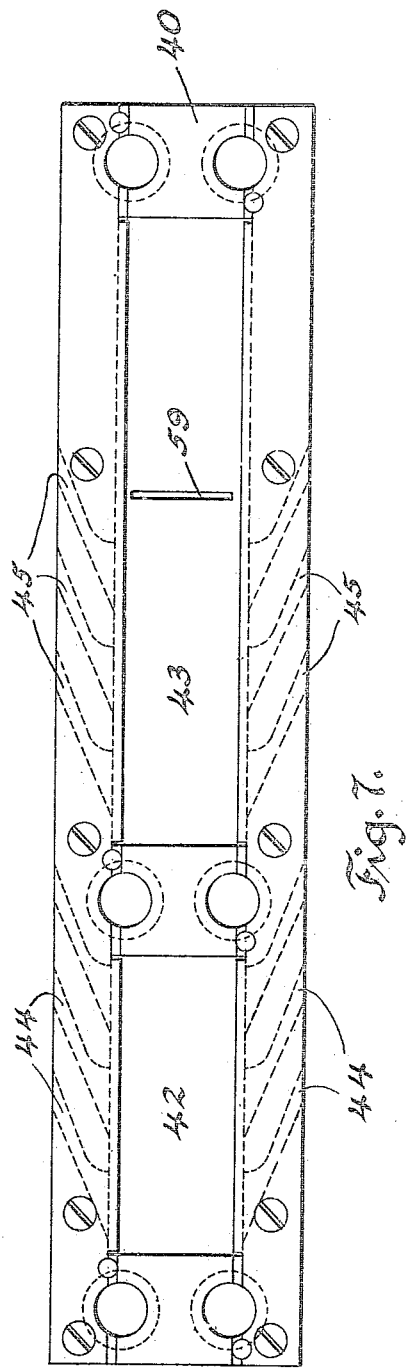
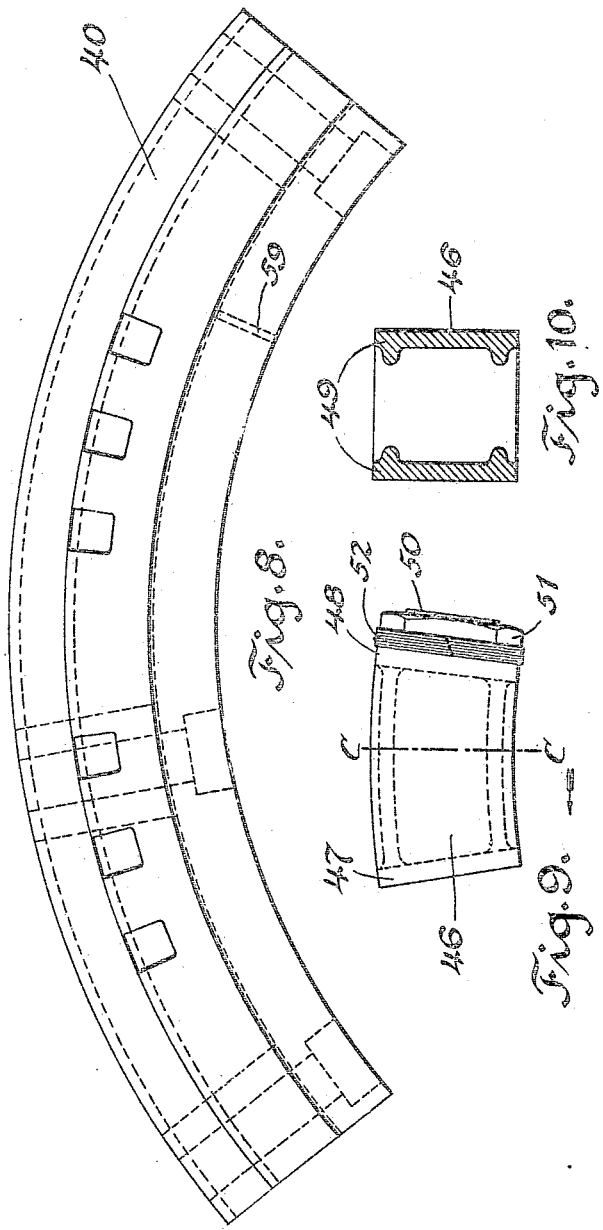
WITNESSES:
INVENTOR
George Westinghouse
BY
ATTORNEY

UNITED STATES PATENT OFFICE.

GEORGE WESTINGHOUSE, OF PITTSBURG, PENNSYLVANIA, ASSIGNOR TO THE WESTINGHOUSE MACHINE COMPANY, A CORPORATION OF PENNSYLVANIA.

ELASTIC-FLUID TURBINE.

953,567.  Specification of Letters Patent.  Patented Mar. 29, 1910.

Application filed December 29, 1905. Serial No. 293,814.

*To all whom it may concern:*

Be it known that I, GEORGE WESTINGHOUSE, a citizen of the United States, and a resident of Pittsburg, in the county of Allegheny and State of Pennsylvania, have invented a new and useful Improvement in Elastic-Fluid Turbines, of which the following is a specification.

This invention relates to elastic fluid turbines, and more particularly to governing means for such turbines.

Various and effective methods have been utilized in connection with elastic fluid turbines for automatically varying the supply of motive fluid in accordance with the varying load demands; and various attempts have been made to perfect a controlling device which will render the turbine equally efficient when operating under light or heavy loads. Among the difficulties encountered in obtaining a wide range of efficient operation are the following: When the motive-fluid passages of the turbine are designed for maximum efficiency at full load, the decreased supply of motive fluid admitted at light load will not fill the passages and consequently the efficiency of the turbine while operating under light load is impaired; conversely, if the motive fluid passages are designed to produce maximum efficiency at light loads, the efficiency, as well as the effective operation of the turbine, is impaired during full or overload. A further difficulty is encountered in obtaining a valve and valve controlling mechanism which will be effective and accurate for all existing conditions, and this is due primarily to the excessively high temperatures encountered in the motive-fluid passages which prevent the proper lubrication of the valve mechanisms.

The object of this invention is the production of an elastic-fluid turbine in which effective and simple means are utilized for obtaining an efficient operation of the turbine for a wide range of loads.

A further object is the production of a turbine in which effective means are utilized for automatically varying, in accordance with the load demand, the effective areas of the motive-fluid supply passages.

A further object is the production of means in connection with a nozzle-controlling device for reducing the friction and overcoming the sticking of the parts whereby a nice adjustment and precise operation of the valve mechanism is obtained.

These and other objects I attain in a turbine embodying the features herein described and illustrated.

The turbine illustrated in the drawings is a type in which motive fluid is admitted at the middle and flows in opposite directions to the exhaust ports. The invention is not, however, limited to this variety, nor, in fact, to any specific type of turbine.

Figure 2:
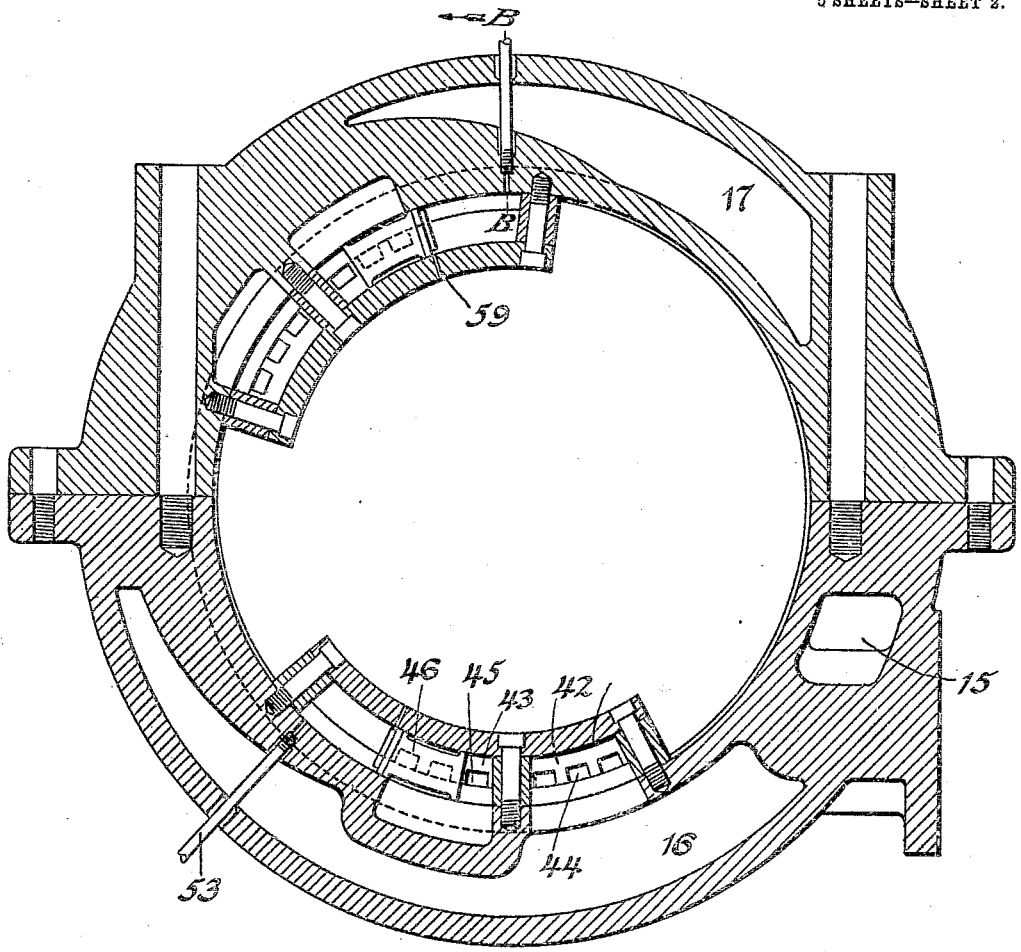
Figure 3:
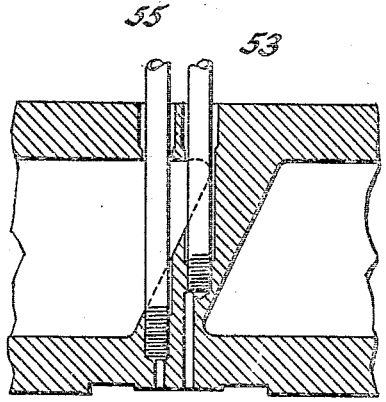

In the drawings accompanying this application, Figure 1 is a partial longitudinal section of a turbine embodying my invention; Fig. 2 is a section along the line A A of Fig. 1. Fig. 3 is a partial section along the line B B of Fig. 2. In Fig. 4 the turbine is shown partially in end elevation and partially in section. Fig. 5 is a partial plan view of the turbine. Fig. 6 is a partial elevation and a partial section of a detail of the apparatus. Fig. 7 is a developed plan of a nozzle block embodied in this invention. Fig. 8 is a side elevation of the nozzle block. Fig. 9 is a side elevation of a detail of the invention. Fig. 10 is a section along the line C C of Fig. 9.

The turbine comprises a rotor 12, rigidly mounted on a shaft 13, which is journaled on suitable standards formed integrally with exterior casing 14, which is provided with an inlet port 15 communicating with annular fluid passages 16 and 17. A steam chest 18, in which a primary admission valve 19 and a secondary admission valve 20 operate, communicates with the steam port 15 through passages 21. The steam enters the turbine in puffs, and the speed regulation is accomplished by proportioning the duration of the puffs to the load. This is done by means of a pilot-valve 22 illustrated in section in Fig. 6, which is controlled by a governor 23 and which in turn controls the operation of the valves 19 and 20. The valve 19 is adapted to be operated by fluid pressure, and is so arranged that steam entering a cylinder 24, through a passage 25, raises, against the action of a spring 26, a piston 27 which is rigidly connected to a valve-stem 28, and thereby opens the valve 19. The actuating steam pressure in the cylinder 24 is controlled by the pilot-valve 22, which periodically exhausts the steam from the cylinder 24 and thereby allows the spring 26 to periodically close the valve.

The pilot-valve is operated by a system of bell-cranks, levers and links, which is controlled by an eccentric 29 suitably driven by the shaft 13 through gears 30 and 31. A lever 32, forming a part of the pilot-valve operating system, is pivoted at 33 on a reciprocating sleeve 34, the position of which is controlled by the governor 23. Variations in the speed of the turbine cause the sleeve 34 to move to different positions relative to the governor standard 35, and this varies the height of the fulcrum 33, which in turn varies the throw of the valve 22 relative to its valve ports 36 and 37. The port 37 of the pilot-valve communicates through a port 38 with the interior of the cylinder 24, and the ports 36 communicate through a suitable passage (not shown) with the atmosphere or a condenser.

As the load on the turbine increases, the period during which the cylinder 24 is closed to the exhaust and consequently the period during which the main valve 19 is open and admitting steam increases, until at some predetermined speed of the turbine or at about full load, the valve 19 continues to pulsate at regular intervals but does not reach its seat. For a further increase of the load the secondary valve 20 begins to open and to admit steam in puffs to the working passages of the turbine. The valve 20 and its operation is the same as that of the main admission valve, and the duration of the admission periods, which occur synchronously with the pulsations of the valve 19, is controlled by the governor.

The passage 16 communicates, through the admission port 15, with the main admission valve 19, and the passage 17 communicates with the secondary admission valve 20. Blades 39 are radially mounted on the rotor 12 and are supplied with steam or other motive fluid through nozzle blocks 40, which communicate with the passages 16 and 17 and are rigidly mounted on the casing 14. The motive fluid discharged from the blades 39 enters additional working blades (not shown) through an annular passage 41 between the rotor and stator. The nozzle block 40 is provided with interior chambers 42 and 43 adapted to supply steam to the motive fluid passages at both ends of the turbine. The chamber 42 communicates with the passages 16 and is provided with nozzles 44 arranged in pairs on either side of the block. The chamber 43 communicates with the passage 17 and is provided with a group of nozzles 45 arranged in pairs on either side of the block.

A reciprocating plunger 46, shown in Figs. 9 and 10, consists of end portions 47 and 48 connected by side walls 49 and is adapted to reciprocate within the chamber 43 and uncover successively the nozzles 45 as the supply of steam from the secondary valve 20 increases to meet the increased load demand. The exterior faces of the walls 49 are finished to a running fit with the interior lateral faces of the chamber 43, and the end face 48 is provided with a threaded portion 50, which is provided with a nut 51, utilized to secure in place a square packing block 52.

The chamber 43 is provided with a small steam inlet pipe 53, which is provided with a valve 54 and a small discharge pipe 55 provided with a valve 56. The steam-supply pipe 53 is connected by pipes (not shown) to the main admission pipe 57, which supplies steam to the steam-chest 18, and the exhaust pipe 55 is connected with an exhaust passage 58 of the turbine. The valve 54 in the steam supply pipe 53 is adapted to control the flow of steam to the chamber 43 and the valve 56 in the exhaust pipe is adapted to control the exhaust from the chamber. By this arrangement a predetermined pressure, a few pounds lower than the boiler pressure, is maintained within the chamber 43 back of the plunger 46. The reciprocating plunger 46 is so arranged that the walls 49 normally close all but one pair of the nozzles 45 and the opposite sides of the face 48 are respectively exposed to the pressure existing in the passage 17 and the adjusted steam pressure of the chamber 43.

While the turbine is operating under light or full load the valve 20 is not in operation and consequently no steam is admitted to the passage 17. But for some predetermined load greater than full load the valve 20 starts to pulsate and to admit puffs of steam to the turbine through the passage 17 and the open nozzles of the group 45. The pulsations of the valve cause regular variations of steam pressure in the passage 17 and consequently the forward face of the end portion 48 of the plunger 46 is subjected to the varying pressure. As the duration of the admission period increases the valve 20 admits greater amounts of steam and for some predetermined load on the turbine the nozzle opening is not sufficient to accommodate the flow of steam through the passage 17 and the pressure resulting from confining the steam is sufficient to overcome the adjusted pressure of the chamber 43 and cause the plunger 46 to reciprocate synchronously with the valve and to periodically open a sufficient number of nozzles to accommodate the turbine's demand for steam.

When the load on the turbine is so great that it slows down an appreciable amount, the secondary valve continues to pulsate, but does not reach its seat and steam is admitted through the secondary nozzles 45 in a continuous stream. The pulsations of the valve, however, cause variations in the steam pressure which cause the plunger 46 to reciprocate synchronously with the pulsations of the valve.

The tendency of the plunger 46 to stick and to be rendered ineffective or inaccurate in operation is practically overcome by the continuous reciprocations, as the friction of rest between the plunger 46 and the surfaces of the chamber 43 is overcome by the fluctuations of the steam pressure in the passages 17. The chamber 43 of the nozzle block is provided with a steam passage 59 which opens into the working passages of the turbine. The area of the passage 59 is such that when communicating with the pipe 53 it will discharge from the chamber 43 all the steam supplied. With this arrangement the plunger 46 will never move far enough to close the first set of the nozzles 45 since, as soon as the passage 59 communicates with the pipe 53 the pressure behind the piston drops and the plunger stops or is forced backward by the pressure in the passage 17.

While I have illustrated and described my invention in connection with a pulsating secondary valve, I do not wish to limit its application to secondary valves, as it may be effectively utilized in turbines provided with but one valve which is designed to vary the port opening in accordance to the load demand on the turbine, from the minimum light load to the maximum overload.

What I claim is:

1. In an elastic fluid turbine, a fluid inlet, a valve controlling said inlet, a plurality of nozzles communicating therewith, a speed-governor adapted to automatically control said valve, mechanisms whereby the fluid admitted by said valve is caused to pulsate and means dependent on the variation of fluid pressure admitted by said valve for opening said nozzles.

2. In an elastic fluid turbine, a fluid inlet, a valve controlling said inlet, a plurality of nozzles, a fluid passage connecting said nozzles with said inlet, mechanisms whereby the fluid admitted by said valve is caused to pulsate, and means sensitive to the variations of fluid pressure in said passages for varying the number of effective nozzles in accordance with the load demand.

3. In an elastic fluid turbine, a fluid inlet, a valve controlling said inlet, a plurality of fluid nozzles, a fluid passage connecting said nozzles with said inlet, a speed governor adapted to control said valve, mechanisms whereby the fluid passing said valve is caused to pulsate and means sensitive to the variations of fluid pressure in said passage adapted to normally close said nozzles.

4. In an elastic fluid turbine, a fluid inlet, a valve controlling said inlet, a plurality of fluid nozzles, a fluid passage connecting said nozzles with said inlet, a speed governor adapted to control said valve, mechanisms whereby the fluid is caused to pulsate in passing said valve and means sensitive to the variations of fluid pressure in said passages whereby said nozzles are held normally closed by an adjustable fluid pressure, until the pressure in said passage is sufficient to overpower said adjustable pressure.

5. In an elastic fluid turbine, a motive fluid admission port, a valve controlling said port, a plurality of fluid nozzles communicating therewith, mechanisms whereby the fluid passing said valve is caused to pulsate and agents sensitive to the variations of fluid pressure adapted to yieldingly close said nozzles until said pressure is sufficient to overpower said agents and open said nozzles.

6. In an elastic fluid turbine, a primary fluid inlet, a secondary fluid inlet, a valve controlling said primary inlet, a secondary valve controlling said secondary inlet, a series of nozzles communicating with said primary inlet, a series of nozzles communicating with said secondary inlet, mechanisms whereby the fluid passing said valves is caused to pulsate and means, sensitive to the variations in fluid pressure, for opening said nozzles.

7. In an elastic fluid turbine, a fluid inlet, a valve controlling said inlet, a plurality of fluid nozzles, a fluid passage connecting said nozzles with said inlet, mechanisms whereby the fluid admitted by said valves is caused to pulsate and means adjusted to yieldingly hold said nozzles closed until the pressure in said connecting passages exceeds some predetermined pressure.

8. In an elastic fluid turbine, a primary fluid inlet, a secondary fluid inlet, nozzles communicating with said primary inlet, a series of supplemental nozzles communicating with said secondary inlet, a governor-controlled valve controlling the admission of fluid through said primary inlet, a governor-controlled valve controlling the admission of fluid through said secondary inlet and means, sensitive to the fluid pressure admitted by said secondary inlet, for closing said supplemental nozzles until said pressure admitted by said valve is sufficient to overpower said means to open said nozzles.

9. In an elastic fluid turbine, a primary fluid inlet, a secondary fluid inlet, a governor-controlled valve controlling the admission of fluid through said primary inlet, a governor-controlled valve controlling the admission of fluid through said secondary inlet, fluid nozzles communicating with said secondary inlet and means, sensitive to the fluid pressure admitted by said secondary valve, for closing said nozzles until the pressure is sufficient to overpower said means to open said nozzles.

10. In an elastic fluid turbine, a primary fluid inlet, a secondary fluid inlet, a governor-controlled valve controlling the admission of fluid through said secondary inlet, fluid nozzles communicating with said secondary inlet and means, sensitive to the fluid pressure admitted by said secondary valve, for closing said nozzles until the pressure is sufficient to overpower said means to open said nozzles.

11. In an elastic fluid turbine, a fluid inlet, a governor-controlled valve controlling said inlet, a plurality of fluid nozzles communicating therewith, mechanisms whereby the fluid passing said valve is caused to pulsate, a plunger, sensitive to variations of fluid pressure admitted by said valve, for closing said nozzles and means for maintaining an adjustable pressure behind said plunger to close said nozzles.

12. In an elastic fluid turbine, a fluid inlet, a governor-controlled valve controlling said inlet, a plurality of fluid nozzles communicating therewith, mechanisms whereby the fluid passing said valve is caused to pulsate, a plunger, sensitive to variations of fluid pressure admitted by said valve, for closing said nozzles and means for admitting an adjustable fluid pressure behind said plunger to close said nozzles.

13. In an elastic fluid turbine, a plurality of fluid nozzles, a piston for regulating the admission of fluid through said nozzles, a valve controlling the operation of said piston and regulating the amount of motive fluid admitted to said turbine and means whereby the fluid passing said valve is caused to pulsate.

14. In a multi-stage elastic fluid turbine, a plurality of normal load nozzles and a plurality of overload nozzles communicating with the initial stage of said turbine, a primary valve, responsive to speed variations, for controlling the delivery of motive fluid to said normal load nozzles, a secondary valve responsive to speed variations and delivering fluid to said overload nozzles only when said primary valve is fully opened, and means, responsive to fluid pressure delivered by said secondary valve, for successively opening said overload nozzles.

15. In a multi-stage elastic fluid turbine, a plurality of normal load nozzles and a plurality of overload nozzles communicating with the initial stage of the turbine, a primary valve responsive to speed variations for controlling the delivery of motive fluid to said normal load nozzles, a secondary valve responsive to speed variations and delivering fluid to said overload nozzles only when said primary valve is fully opened, and means for successively opening said overload nozzles.

16. In an elastic fluid turbine, a plurality of normal load nozzles and a plurality of overload nozzles, a primary valve responsive to speed variations from no load to normal load, controlling the delivery of fluid to the normal load nozzles, and means, operating when said primary valve is fully open, to successively open said overload nozzles.

17. In an elastic fluid turbine, a plurality of fluid nozzles, a valve controlling the delivery of motive fluid to said nozzles, a plunger sensitive to fluid pressure delivered by said valve for successively opening said nozzles in response to an increase of load on said turbine, and means for admitting an adjustable fluid pressure behind said plunger to close said nozzles.

18. In combination in a multi-stage elastic fluid turbine, a primary valve delivering fluid to the initial stage of said turbine, a plurality of overload nozzles communicating with the initial stage, a secondary valve responsive to speed variations of said turbine, delivering a separate supply of motive fluid to said nozzles, and means for successively opening said nozzles in accordance with the variations of speed of said turbine.

19. In combination in a multistage elastic fluid turbine, a normal load valve for delivering motive fluid to the initial stage of said turbine, a plurality of fluid nozzles, an overload valve controlling the delivery of motive fluid to said nozzles and adapted to open only when said normal load valve is fully opened, and means for pulsating the fluid delivery by both of said valves.

In testimony whereof, I have hereunto subscribed my name this 27th day of December, 1905.

GEO. WESTINGHOUSE.

Witnesses:
 CHARLES W. McGHEE,
 JNO. S. GREEN.